Dec. 29, 1953 — A. W. ZMUDA — 2,664,075
VALVE ROTATING DEVICE
Filed Nov. 9, 1949

Inventor
Andrew W. Zmuda
By Willits, Helmig & Baillio
Attorneys

Patented Dec. 29, 1953

2,664,075

UNITED STATES PATENT OFFICE 2,664,075

VALVE ROTATING DEVICE

Andrew W. Zmuda, Detroit, Mich., assignor to General Motors Corporation, Detroit, Mich., a corporation of Delaware Application November 9, 1949, Serial No. 126,324

4 Claims. (Cl. 123—90)

This invention relates to poppet valves for internal combustion engines and the like and more particularly to means for effecting axial rotation of the valves simultaneously with their reciprocation.

Broadly, the invention employs the twisting effect of the conventional coil return spring to provide a rotative force for rotating the valve, together with an improved one-way clutch device for transmitting this rotative force to the valve. While attempts have been made in the prior art to utilize this twisting effect of the return spring for effecting valve rotation, the results heretofore obtained have not been commercially satisfactory for want of a fully dependable, simple and economical clutch means for controlling the transmission of rotative forces from the spring to the valve.

Accordingly it is the principal object of my invention to provide an improved valve rotating device in which the transmission to the valve of the rotative force produced by the twisting action of the coil return spring is controlled in a novel and advantageous manner by a one-way clutch.

A more specific object of the invention is to provide such a device wherein the one-way clutch is in the form of a coil spring whose convolutions are adapted to embrace and frictionally engage the valve stem, one end of the clutch spring being anchored to the valve operating rocker.

Another specific object of the invention is to provide such a device wherein the one-way clutch is in the form of a coil spring whose convolutions are adapted to rotatively engage one end of the valve return spring, one end of the clutch spring being anchored to the engine frame.

The means by which these and other objects are attained will be clearly understood from the following description of two alternative embodiments of my invention, having reference to the drawing in which.

Figure 1:
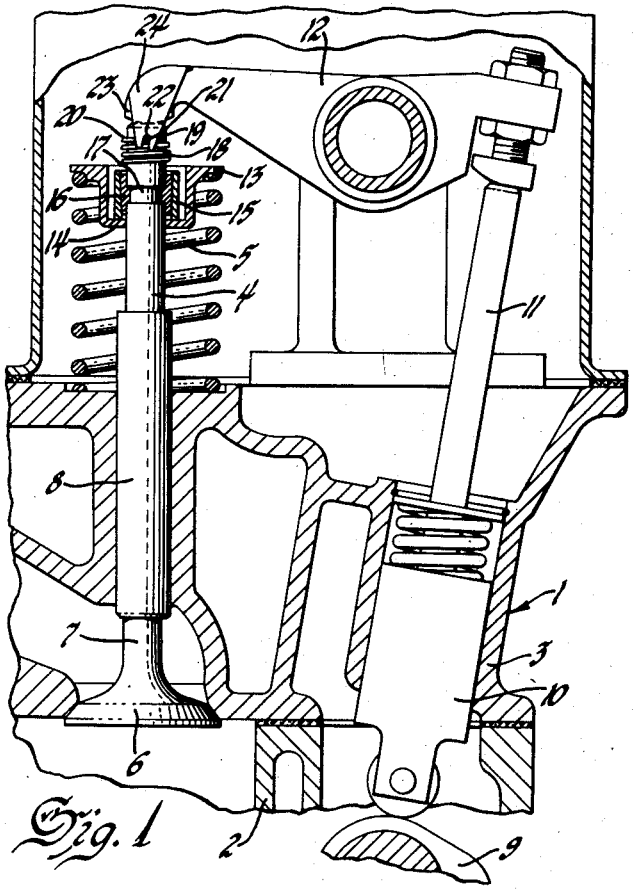
Figure 1 is a side elevational view of a portion of an internal combustion engine showing my improved clutch means operative directly on the valve stem, with parts broken away and in section.
Figure 2:
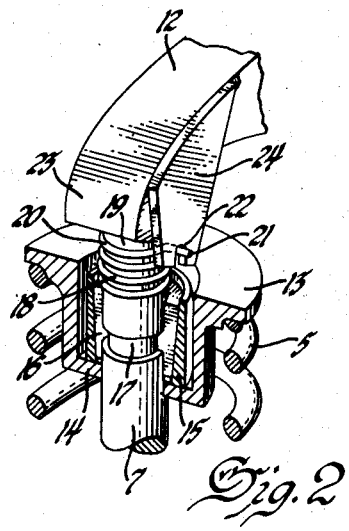
Figure 2 is an enlarged fragmentary view in perspective showing the clutch means of Figure 1.

Referring now to Figures 1 and 2 of the drawing, the numeral 1 designates generally the frame of an internal combustion engine comprising a cylinder block 2 and cylinder head 3. Valve means including a poppet valve 4 and coil return spring 5 are shown, the valve having a head 6 carried by a stem 7 which is slidably supported for reciprocation and rotation in a valve guide 8 fixed in the cylinder head 3. Actuating means for the valve includes a cam 9, follower 10, push rod 11 and valve rocker 12. Downward movement of the valve 4 as shown in Figure 1 during operation is resiliently resisted by the coil return spring 5, the lower end of which abuts against the cylinder head 3 and the upper end of which bears against the retainer washer 13. The inturned flange 14 of the latter washer is held upwardly due to spring pressure against the internally tapered ring 15 in which is seated the externally tapered split collar 16 engaging the valve stem 7 at the groove 17.

The wedging engagement of the split collar 16 between the ring 15 and the valve stem 7 insures the latter being rotated upon any rotation being imparted to the ring 15. Between the lower end of the ring 15 and the inturned flange 14 of the cylinder washer 13 there is sufficient frictional resistance against relative movement to insure the ring 15 (and consequently the valve 4) being rotated when the retainer washer 13 is rotated, except when the valve stem 7 is positively held from rotating. The inherent twisting of one end of the return spring 5 relative to the other when this spring is flexed provides a rotative force for effecting the rotation of the retainer washer 13, ring 15, split collar 16 and the valve stem 7. Unless some means is provided for holding the valve from rotating in one direction under this twisting action of this spring 5, the valve will naturally oscillate equally in both directions about its axis.

The means I have employed for effecting this one-way holding function comprises a coil spring 18 whose convolutions have an internal diameter slightly (approximately .002 inch) smaller than the external diameter of the upper end 19 of the valve stem 7. The upper convolution 20 of this clutch spring terminates in a bent out portion 21 which is received in a notch 22 formed on the valve stem end 23 of the rocker 12. In the particular construction illustrated the notch 22 is provided at the lower end of the finger 24 which is welded to one side of the rocker arm end 23.

In operation, during downward movement of the valve 4 towards open position in response to the oscillation of the rocker 12, the end 21 of the clutch spring is given a slight horizontal movement toward the right as viewed in Figure 1 in response to the component of movement in that direction of the notch 22 on the rocker arm. As a result, the clutch spring 18 tends to further tighten about the end 19 of the valve stem and the valve stem is rotated a small amount in one direction (counterclockwise as viewed looking down upon the upper end 19 of the valve stem).

The simultaneous downward movement of the valve stem causes the valve return spring 5 to compress; and its lower end being effectively anchored against rotation by its frictional engagement with the cylinder head 3, a rotative force in the clockwise direction is transmitted to the retainer washer 13. The latter, rotating in the opposite direction from that of the valve stem, is made to slip on the ring 15. During the return or upward movement of the valve toward closing, the horizontal movement of the groove 22 being in the opposite direction, the clutch spring 18 is moved in a releasing direction; and the rotation of the retainer washer 13 which is now in a counterclockwise direction accompanying the unwinding of the spring 5 rotatively carries the ring 15 with it and rotates the valve.

Figure 3:
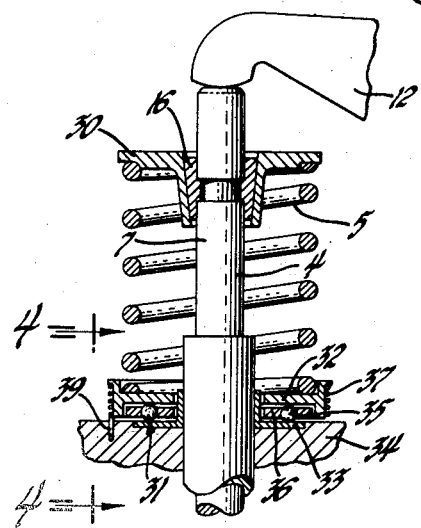
Figure 3 is a fragmentary view similar to Figure 1 but showing an alternative form of my invention in which the clutch means is installed between one end of the valve return spring and the engine frame.
Figure 4:
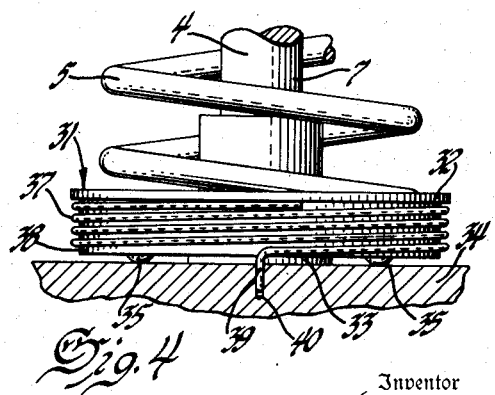
Figure 4 is an enlarged elevational view taken from line 4—4 of Figure 3.

In the embodiments shown in Figures 3 and 4 I have arranged to rotatively anchor the upper end of the return spring 5 to the valve stem 7 by means of a retainer washer 30 having a tight tapered fit directly around the split collar 16. The lower end of the return spring 5 rests on an antifriction bearing 31 comprising an upper raceway 32 and a lower raceway 33, the latter being secured to the cylinder head 34. Separating the raceways are a plurality of balls 35 circumferentially carried in a cage 36.

This arrangement is such that without any restriction being applied to the upper raceway 32 the twisting effect produced in the spring 5 during contraction and elongation thereof is rotatively insulated from the valve stem 7. In other words, without any restriction to rotation of the upper raceway 32, this member would oscillate during valve opening and closing and the valve would not rotate.

To provide means for transmitting the rotative force of the spring 5 in one direction only, I have installed a coil spring 37 whose convolutions have an inside diameter slightly smaller than the cylindrical outer periphery 38 of the upper raceway 32, and whose lower end or terminus 39 is anchored against rotation in a socket 40 formed in the cylinder head 34.

The operation of this embodiment of my invention is generally similar to that previously described for Figures 1 and 2 except that the coil clutch spring 37 serves to alternatively release and rotatively lock one end of the valve return spring 5 rather than alternatively releasing and locking the valve stem 7 directly. During downward or opening movement of the valve 4 the lower end of the valve spring 5 is held from rotating by the coil clutch spring 37, and the inherent twisting of the spring 5 causes its upper end to rotate in a clockwise direction, the retainer washer 30 being rotatively carried therewith and rotating the valve stem 7. Upon the reverse or upward movement of the valve 4 toward closing, the lower end of the spring 5 is free to rotate in a clockwise direction since its movement in that direction is unhindered by the clutch spring 37; and by reason of this freedom of movement of the lower end of spring 5 in a clockwise direction its upper end is not induced to rotate counterclockwise. Hence the valve remains rotatively stationary during valve closing.

It is to be understood that while I have shown the clutch springs 18 and 37 wound so as to operate in the manners stated with the valve return spring 5, obviously the direction of winding of either clutch spring or of the return spring may be reversed to obtain the desired direction and timing of valve rotation with valve opening and closing.

I claim:

1. In an internal combustion engine, an engine frame having a valve seat, a poppet valve having a stem, a first coil spring normally holding the valve on its seat and effectively anchored at one of its ends against rotation relative to the engine frame, a connection between the opposite end of said first spring and the valve stem tending to transmit rotary movement from the spring to the valve, valve opening mechanism including a rocker in operative engagement with the valve stem, and a second coil spring snugly embracing the valve stem and rotatively anchored at one end only to the rocker.

2. In an internal combustion engine, valve means including a valve and a coil return spring normally holding the valve in closed position, relative rotation between opposite ends of said return spring during elongation and contraction providing a rotative force for rotating the valve, means anchoring one end of said return spring against rotation in either direction about the axis of the valve, a connection between the opposite end of said return spring and the valve capable of transmitting rotary movements of said opposite spring end to the valve except when the valve is held from rotating therewith, a second coil spring embraceably gripping the valve for holding the valve from rotating in one direction with said opposite end of said return spring, and means anchoring one end only of said second spring.

3. In an internal combustion engine, a valve operating rocker, valve means including a valve movable in response to movement of the rocker and a coil return spring, relative rotation between opposite ends of said return spring during elongation and contraction providing a rotative force for rotating the valve, means effectively anchoring one end of said return spring against rotation in either direction about the axis of the valve, a friction rotary driving connection between the opposite end of said return spring and the valve, one-way clutch means rotatively engaging the valve and drivingly connected to the rocker, said clutch means being effective in response to movement of the rocker in one direction to rotatively drive the valve in a direction opposite to that at which it is urged by the rotation of said opposite end of the return spring.

4. In combination with a poppet valve having a stem guided for axial rotation and reciprocation, a valve operating rocker including a stem engaging portion having lateral movement in alternately opposite directions relative to the stem during valve reciprocation, a coil spring embracing the stem and accommodating their relative rotation in one direction only, one end of the spring being loosely anchored to said rocker portion whereby the spring is oscillated rotatively about the axis of the stem and the stem is progressively rotated simultaneously with the reciprocation of the valve.

ANDREW W. ZMUDA.

References Cited in the file of this patent

UNITED STATES PATENTS

| Number | Name | Date |
|---|---|---|
| 1,005,897 | Shields et al. | Oct. 17, 1911 |
| 1,534,476 | Wirrer | Apr. 21, 1925 |

OTHER REFERENCES

American Machinist publication, August 19, 1943 (page 103), 81/60. (Copy available in Division 29.)